US008098801B2

(12) United States Patent
Kasturi et al.

(10) Patent No.: US 8,098,801 B2
(45) Date of Patent: *Jan. 17, 2012

(54) SYSTEMS AND METHODS FOR INFORMATION EXCHANGE AND SYNCHRONIZATION USING DTMF OVER TELEPHONE COMMUNICATION CHANNELS

(75) Inventors: Srivatsan Kasturi, Saratoga, CA (US); G. Alagiri, San Jose, CA (US); Vinod Nagarajan, Saratoga, CA (US); Rajah Kalipatnapu, San Jose, CA (US); Darrell Fongson, Saratoga, CA (US)

(73) Assignee: Vertical Communications Acquisition Corp., Sarasota, FL (US)

( * ) Notice: Subject to any disclaimer, the term of this patent is extended or adjusted under 35 U.S.C. 154(b) by 1415 days.

This patent is subject to a terminal disclaimer.

(21) Appl. No.: 11/499,908

(22) Filed: Aug. 7, 2006
(Under 37 CFR 1.47)

(65) Prior Publication Data

US 2007/0121830 A1    May 31, 2007

Related U.S. Application Data

(63) Continuation of application No. 10/909,834, filed on Aug. 3, 2004, now Pat. No. 7,088,804, which is a continuation of application No. 10/033,372, filed on Oct. 17, 2001, now Pat. No. 6,771,751.

(60) Provisional application No. 60/241,270, filed on Oct. 17, 2000.

(51) Int. Cl.
*H04M 11/00* (2006.01)

(52) U.S. Cl. .................................. 379/93.27; 379/93.26

(58) Field of Classification Search ............... 379/93.27, 379/93.26, 93.01, 93.08, 93.15, 93.18
See application file for complete search history.

(56) References Cited

U.S. PATENT DOCUMENTS

| 4,799,254 | A   | 1/1989  | Dayton et al. |
|-----------|-----|---------|---------------|
| 6,012,088 | A   | 1/2000  | Li et al. |
| 6,166,666 | A   | 12/2000 | Kadyk |
| 6,233,323 | B1  | 5/2001  | Ali et al. |
| 6,314,516 | B1  | 11/2001 | Cagle et al. |
| 6,320,942 | B1* | 11/2001 | Chang ........................ 379/93.27 |
| 6,396,921 | B1  | 5/2002  | Longster |
| 6,771,751 | B1* | 8/2004  | Kasturi et al. ............. 379/93.27 |
| 7,088,804 | B1* | 8/2006  | Kasturi et al. ............. 379/93.27 |

FOREIGN PATENT DOCUMENTS

| JP | 62214760 A | 9/1987 |
| JP | 62263751 A | 11/1987 |
| JP | 03243050 A | 10/1991 |

\* cited by examiner

*Primary Examiner* — Stella L Woo
(74) *Attorney, Agent, or Firm* — Sterne, Kessler, Goldstein & Fox P.L.L.C.

(57) ABSTRACT

Systems, methods, protocols and apparatus for information exchange and synchronization using DTMF signaling over telephone communication channels are provided. Information is packetized and converted from one format, e.g., ASCII formatted data, to another format, e.g., BCD formatted data. The information is wrapped in one or more packets by a sending apparatus, each packet including one or more headers, such as a Name and Length field that identify the information being exchanged and the amount of data included in the packet payload/value field. The data in the packets are converted from BCD to DTMF signals and are transmitted over a telephone communication line to a receiving apparatus. The receiving apparatus converts the DTMF signals back to BCD formatted data and processes the packets to obtain the information contained therein.

10 Claims, 13 Drawing Sheets

| | Name | |
|---|------|---|
| 1. "First" | First Name |
| 3. "Middl" | Middle Name |
| 5. "Home" | Home Phone Number |
| 7. "Fax" | Fax Phone Number |
| 9. "Mobil" | Mobile Phone Number |
| 11. "City" | City Name |
| 13. "Zip" | Zip Code |
| 15. "SocNo" | Social Security Number |
| 17. "Birth" | Birth Date |

| | Name | |
|---|------|---|
| 2. "Last" | Last Name |
| 4. "Email" | Email |
| 6. "Work" | Work Phone Number |
| 8. "Pager" | Pager Number |
| 10. "Addre" | Address of a place |
| 12. "State" | State Name |
| 14. "Count" | Country Name |
| 16. "Drive" | Driver's License Number |
| 18. "Direc" | Directions to place |

Name

| 1. "First" | First Name |
| 3. "Middl" | Middle Name |
| 5. "Home" | Home Phone Number |
| 7. "Fax" | Fax Phone Number |
| 9. "Mobil" | Mobile Phone Number |
| 11. "City" | City Name |
| 13. "Zip" | Zip Code |
| 15. "SocNo" | Social Security Number |
| 17. "Birth" | Birth Date |

Name

| 2. "Last" | Last Name |
| 4. "Email" | Email |
| 6. "Work" | Work Phone Number |
| 8. "Pager" | Pager Number |
| 10. "Addre" | Address of a place |
| 12. "State" | State Name |
| 14. "Count" | Country Name |
| 16. "Drive" | Driver's License Number |
| 18. "Direc" | Directions to place |

SYSTEMS AND METHODS FOR INFORMATION EXCHANGE AND SYNCHRONIZATION USING DTMF OVER TELEPHONE COMMUNICATION CHANNELS

CROSS-REFERENCES TO RELATED APPLICATIONS

This application is a continuation of U.S. Non-Provisional patent application Ser. No. 10/909,834, filed Aug. 3, 2004, now U.S. Pat. No. 7,088,804, issued Aug. 8, 2006, which is a continuation of U.S. Non-Provisional patent application Ser. No. 10/033,372, filed Oct. 17, 2001, now U.S. Pat. No. 6,771,751, issued Aug. 3, 2004, entitled "Systems and Methods for Information Exchange and Synchronization Using DTMF Over Telephone Communication Channels," which claims the benefit of U.S. Provisional Patent Application Ser. No. 60/241,270, filed Oct. 17, 2000, all of which are hereby incorporated by reference in their entirety.

BACKGROUND OF THE INVENTION

The present invention relates generally to information exchange, and more particularly to information exchange using DTMF signaling over telephone communication channels.

In real life, people exchange numbers and information all the time. Typically such information exchange is performed verbally or using paper documents. With the advent of computer systems and digital data communications technology, such information is now commonly exchanged over various computer networks such as the Internet using various protocols and communication applications. E-mail is perhaps the most prevalent form of information exchange today.

Using telephone communications technology, people exchange information using sending apparatus and receiving apparatus, however, such exchange is usually limited to verbal information exchange. As one example, one individual may provide a phone number or address information to a second individual using a telephone. The second individual must write down the information, which may not be convenient, or commit it to memory for writing down at a later time. For example, the second user may be using a cell phone and not have the ability to immediately write the information down. In the case of a programmable cell phone, the second user may immediately manually program a phone number into the cell phone, however this tends to disrupt the conversation with the first user.

Additionally, other information such as address information is not generally the type of information for which a cell phone is designed to conveniently store.

The number system is widely used throughout the world in telephone systems because of its simplicity and the deployed apparatus are easy to use. Dual tone multifrequency (DTMF) signaling is a signaling scheme used in telephone systems to transmit the characters 0-9, and the * and # characters found on standard telephone keypads, and is primarily used to "dial" telephone numbers, i.e., direct calls to an appropriate receiving apparatus. DTMF is a technique that converts numbers (and select characters) to a particular frequency set, which can be converted back to the particular number. Yet, numbers are not electronically exchanged through the voice band even though sending and receiving apparatus are capable of receiving numbers using DTMF signaling in parallel to voice band while a voice conversation session is active.

Accordingly, it is desirable to provide systems, methods and protocols for exchanging information between sending and receiving apparatus using DTMF signaling.

BRIEF SUMMARY OF THE INVENTION

The present invention provides systems and methods for exchanging numbers and characters between sending apparatus and receiving apparatus using generic protocols that can be expanded to various applications.

Systems, methods, protocols and apparatus for information exchange and synchronization using DTMF signaling over telephone communication channels are provided. Information is packetized and converted from one format, e.g., ASCII formatted data, to another format, e.g., BCD formatted data. The information is wrapped in one or more packets, each packet including one or more headers, such as a Name and Length field that identify the information being exchanged and the amount of data included in the packet payload/value field. The data in the packets are converted from BCD to DTMF signals and are transmitted over a telephone communication line to a receiving apparatus. The receiving apparatus converts the DTMF signals back to BCD formatted data and processes the packets to obtain the information contained therein.

According to one aspect of the present invention a method is provided for communicating alphanumeric data between two communication devices over a telephone communication channel, the alphanumeric data including a plurality of alphanumeric characters. The method typically includes converting the alphanumeric data to data having a first data format, wherein each converted character comprises a first plurality of characters in the first data format, converting the data having the first data format to data having a second data format, wherein each converted character comprises a plurality of numbers in the second data format, and communicating the data in the second data format from a first communication device to a second communication device over the telephone communication channel using DTMF signaling According to another aspect of the present invention, a method is provided for communicating alphanumeric data between two communication devices over a telephone communication channel, the alphanumeric data including a plurality of alphanumeric characters. The method typically includes receiving data representing the alphanumeric data, said received data having a first data format, wherein each alphanumeric character is represented by a first plurality of characters in the first data format, converting the data having the first data format to BCD decimal formatted data, wherein each alphanumeric character is represented by three numerical characters in the BCD format, and communicating the data in the BCD format from the first communication device to a second communication device over the telephone communication channel using DTMF signaling.

According to yet another aspect of the present invention, a communication apparatus is provided for sending and receiving data over a telephone communication channel using DTMF signaling. The apparatus typically includes a telephone interface module configured to send and receive frequency signals over a telephone communication channel, a DTMF coding and decoding module configured to convert received DTMF signals to data packets having a first protocol format and to convert data packets having the first protocol format to DTMF signals, and a packet processing module configured to convert data received from a user input device to data packets having the first protocol format and to process data packets in the first protocol format received from the DTMF module.

According to a further aspect of the present invention, a communication system is provided that typically includes a configuration server coupled to a telephone communication network, and a communication device having a telephone communication interface for coupling to the telephone communication network, each of said communication device and configuration server including a DTMF coding and decoding module configured to convert received DTMF signals to data packets having a first protocol format and to convert data packets having the first protocol format to DTMF signals. In operation, the communication device automatically establishes a communication session with the configuration server when the telephone interface is connected with the telephone communication network, wherein the configuration server sends one or more packets of configuration information having the first protocol format to the communication device in the form of DTMF signals, and wherein the communication device converts the received DTMF signals to said one or more packets of configuration information having the first protocol format.

According to yet a further aspect of the present invention, a method is provided for automatically configuring a communication device having a telephone communication interface for coupling to a telephone communication network. The method typically includes automatically establishing a communication session with a configuration server over the telephone communication network when the telephone communication interface is coupled to the telephone communication network, and receiving one or-more configuration packets from the configuration server, each configuration packet including configuration information, wherein the received configuration packets are in the form of DTMF signals. The method also typically includes converting the DTMF signals to one or more packets having a first protocol format, and processing the one or more configuration packets having the first protocol format to obtain the configuration information.

Reference to the remaining portions of the specification, including the drawings claims and Appendices, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION OF THE INVENTION

The present invention provides systems, apparatus, methods and protocols for communicating information over standard telephone communication channels. There are typically 2 distinct domains that are used for communication of information: the number domain, which runs from 0 to 9, and the Alphanumeric character domain, which runs from [a-z] and [A-Z]. As used herein in one embodiment, the alphanumeric character domain is intended to also include the number domain [0-9] as well as additional special characters that can be converted to ASCII as defined by the ASCII table from the ANSI committee. In this embodiment, if the ASCII table is used, all characters and numbers convert to the number domain. Appendix A includes characters and numbers and associated converted values in ASCII 8-bit binary (truncate the first digit for 7-bit binary), hexadecimal, octal and BCD decimal representations. Other character domains also exist and are represented by various Unicode conversion standards. Examples of Unicode conversion standards include conversions for kanji and arabic character sets, and any other various glyphs, symbols, characters and alphabets in existence. Information about various Unicode standards can be found at www.unicode.org. Appendix B includes an example of a Unicode conversion table.

Figure 1:
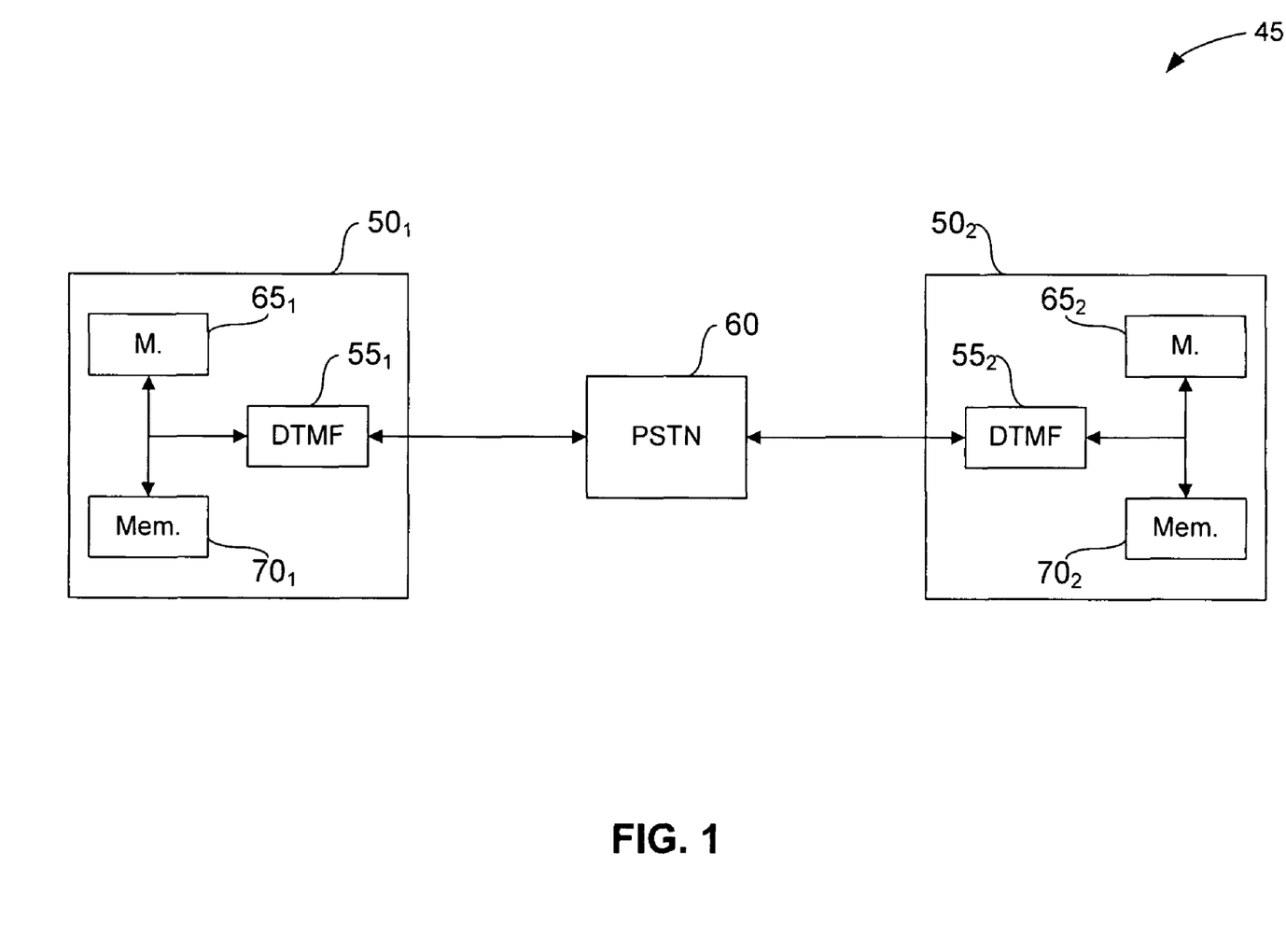
FIG. 1 illustrates a system including a sending apparatus configured to send information in the number domain to a receive apparatus using DTMF signaling according to one embodiment of the present invention.

FIG. 1 illustrates a system 45 including a sending apparatus 50$_1$ configured to send information in the number domain to a receive apparatus 50$_2$ using DTMF signaling according to one embodiment of the present invention. Each of the send and receive apparatus 50 may include a conventional telephone, a cell phone, answering machine, PDA, Laptop or desktop computer system, or any other device configured to send and receive DTMF signals. As shown, each device 50 includes a DTMT CODEC 55 that processes DTMF signals as is well known. Communication channel 60 typically includes a standard PSTN telephone channel, however, wireless channels and VoIP channels may be included. For example, where one of the devices 50 is a cell phone, a wireless connection to a cell phone base tower is included in the communication channel. Preferably, each of the send and receive apparatus 50 includes intelligent processing capability. As shown, for example, each apparatus 50 includes a processor 65 that provides overall processing and configuration control of the information. packets according to the protocols and methods of the present invention. A memory 70 is provided for storing data as well as conversion parameters and look-up tables in some embodiments.

One embodiment of the present invention relates to such protocols useful for transferring information over communication channels between a sending apparatus and a receiving apparatus. Preferably telephonic communication channels are used to communicate the information, e.g., from a cell phone or conventional phone to another cell phone or conventional phone, in parallel to the voice band while a voice conversation session is active. However, it is not necessary that a voice conversation is actually occurring. Generally, any communication channel capable of communicating analogue frequency signals may be used.

Figure 2A:
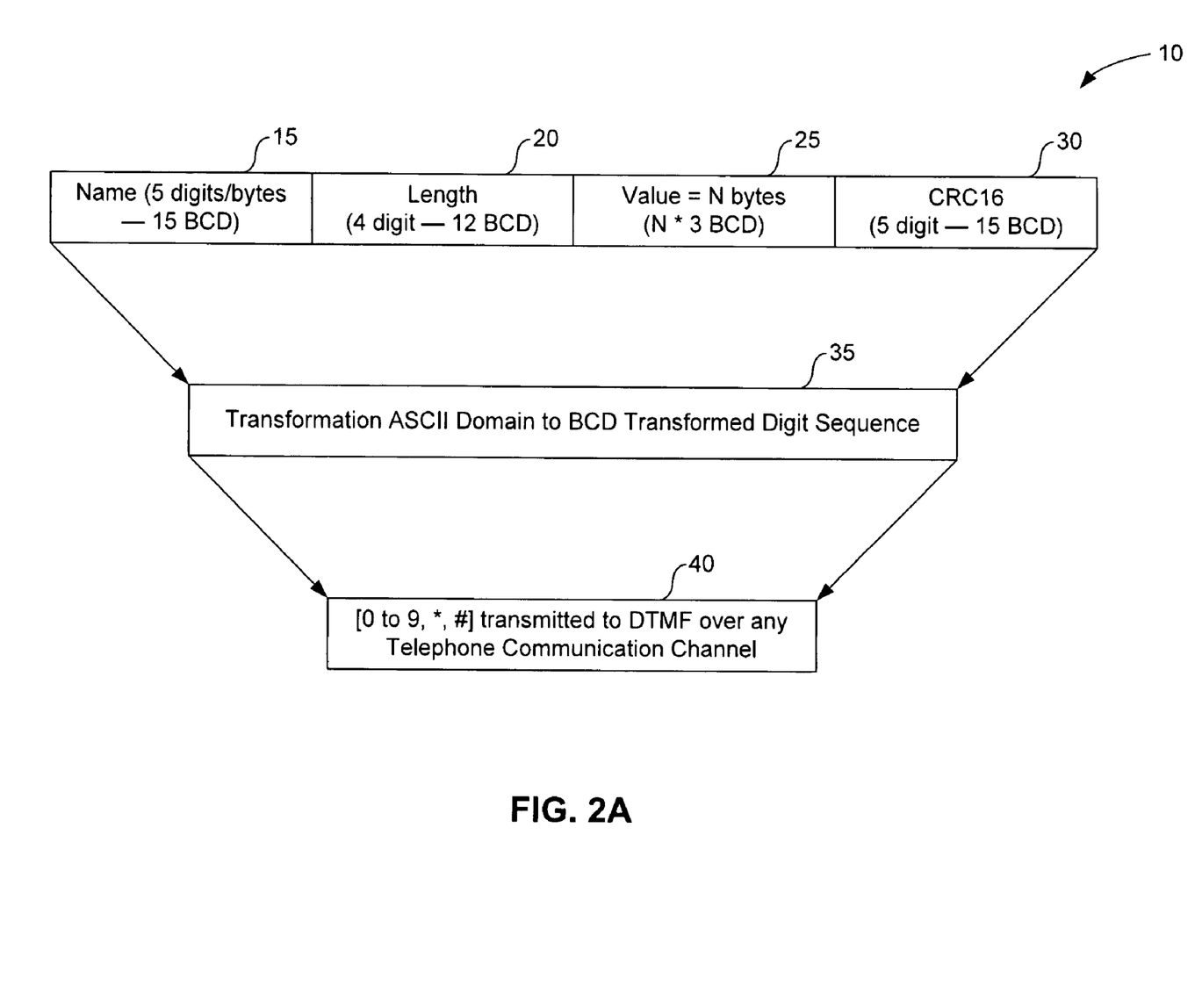
FIG. 2 illustrates an exemplary protocol format for communicating data using DTMF signaling according to an embodiment of the present invention.
Figure 2B:
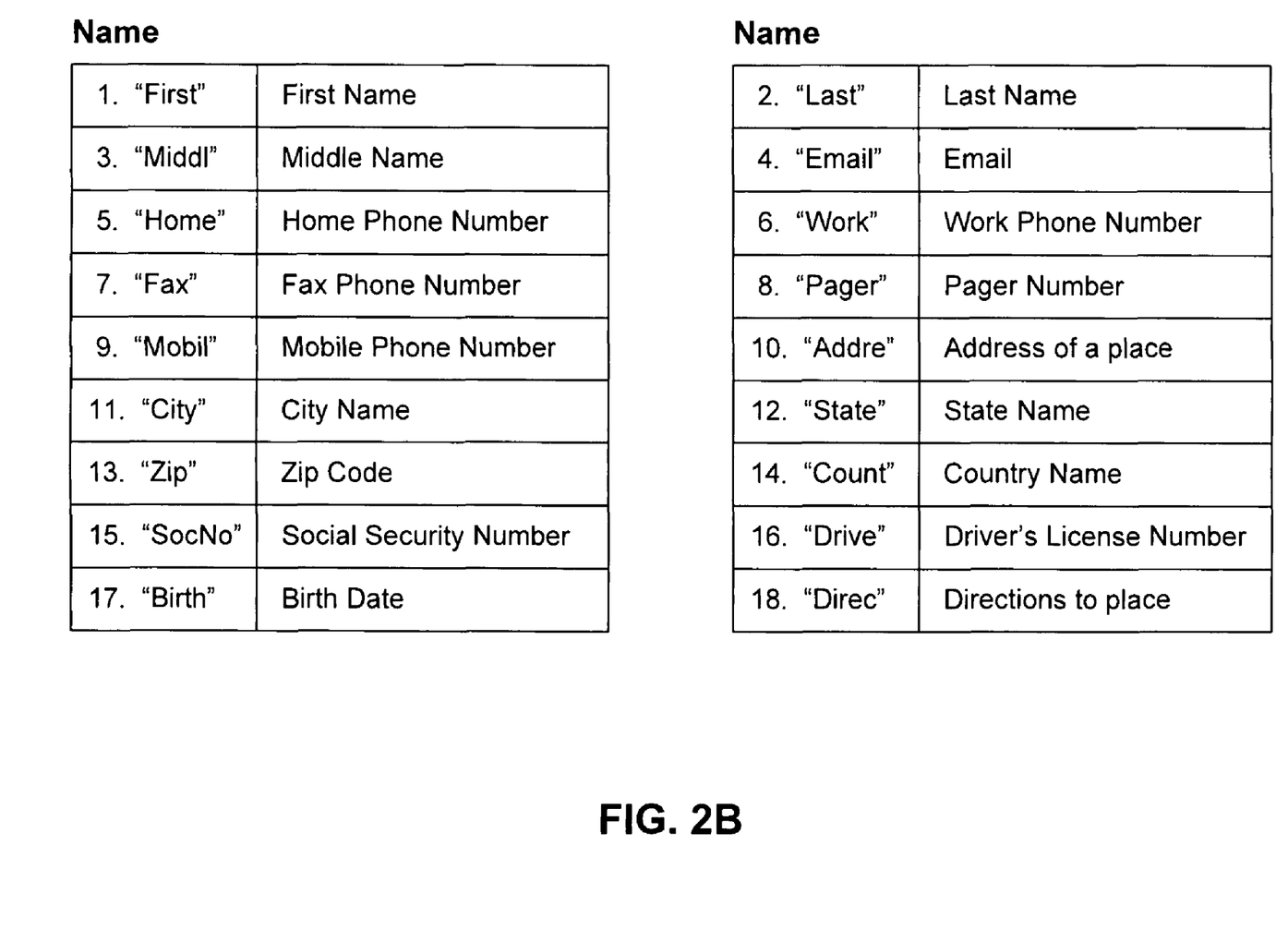

An exemplary embodiment of a packet format for use in communicating data using DTMF signaling is shown in FIG. 2A. As shown, a packet 10 includes a Name field 15, a Length field 20, a Value field 25 and an optional CRC field 30. Name field 15 in one embodiment identifies the parameter/data field the packet is holding. Name field 15 in the embodiment as shown includes a maximum of 5 alphanumeric characters, although it may be configured with a maximum exceeding 5 characters or as few as 1 character. If fewer than the maximum number of characters are included, the remainder is padded with spaces in one embodiment. Each alphanumeric character preferably comprises one byte (8 bits) in ASCII binary, although 7-bits may be used in some embodiments. Name field 15 is generally a generic text field that is associated with any field inside the individual system. FIG. 2B illustrates examples of possible Name fields.

Length field 20 identifies the number of bytes of data in Value field 25, and preferably includes 4 digits [0-9999] (4 ASCII bytes), although more digits may be used. If there is no Value field, the Length is 0. Value field 25 includes the actual data being exchanged for the identified parameter/field. If N characters comprise the Value of the identified field then Value field 25 includes N bytes (ASCII). Optional CRC field 30 is provided to protect against noisy transmission, e.g., as may be present in cell phone networks. CRC field 30 includes a computed CRC of the Name, Length and Value fields, but excluding the CRC field itself. Appendix D illustrates examples of other useful packet formats and fields according to the present invention.

In one embodiment, the packet 10 is converted from the ASCII domain to a BCD digit sequence 35. En this embodiment, the Name, Length, Value and CRC protocol fields are each converted from the ASCII domain (e.g., 7 or 8 bit binary for each character) to an associated 3-digit BCD decimal code. For example, with reference to Appendix A, the letter "A" is converted from "01000001" in binary to "065" in BCD. Such transformation is preferably executed by processor 65 using a lookup table, e.g., stored in memory module 70, although a specialized conversion module may be used. For example, look-up and conversion may be implemented using an FPGA or algorithmically. The transformed packet is then converted to a dual tone multi-frequency (DTMF) signal 40 by DTMF CODEC 55 and transmitted over the communication channel. As is well known, DTMF is a signaling scheme used in conventional phone signaling systems for transmitting the characters 0-9 and the * and # characters found on standard telephone keypads. Appendix C shows a standard DTMF frequency map.

The receiving apparatus receives the DTMF signal representing packet 10. The receiving apparatus' DTMF CODEC 55 converts the DTMF signal to 3-digit BCD. In one embodiment, the receiving apparatus converts the packet back to the ASCII domain and stores the ASCII data to memory. Alternatively, the receiving apparatus stores the BCD formatted data to memory. The raw DTMF signal may also be stored if desired. In another embodiment, a Unicode hexadecimal code format is used in place of the ASCII format. Appendix B shows an example of a Unicode conversion table. Using this table, for example, the character/letter "A" would be converted to "0041" in Unicode and the character/letter "m" would be converted to "006D".

As an example, if it is desired to send information related to an individual named "John Doe", excluding the CRC field, the protocol packet for the first name "John" would be arranged in ASCII binary (8-bit) format as follows according to the present exemplary embodiment:
Field:
Name: ("First") 01000110/01101001/01110010/01110011/01110100
Length: ("0004") 00110000/00110000/00110000/00110100
Value: ("John") 01001010/01101111/01101000/01101110.

When converted to 3-digit BCD format, the packet would be arranged as follows:
Field:
Name: ("First") 070/105/114/115/116
Length: ("0004") 048/048/048/052
Value: ("John") 074/111/104/110.

The DTMF signal for the first name packet, excluding CRC field, would thus be "07010511411511604804804805207411104110". The backslashes ("/") in the above example are used solely to assist the reader to delineate each character relative to the others and are not part of the present protocol.

As an exemplary use for the protocol, consider the situation where one party to a phone conversation may desire to send a fax number, and/or direction or address information to the recipient during a conversation. Rather than orally communicating such information, which may be burdensome if, e.g., the recipient is driving a car and must write the information down, the sender keys in the information (name plus other information) on the telephone keypad or retrieves the information from a memory in the telephone, and presses a "send" key. The information is packetized according to the above protocol, transformed into BCD 3-digit formatted data and sent as a DTMF signal using the above protocol over the communication channel while the conversation session is active. The recipient's phone receives the DTMF signal and transforms it back to the BCD 3-digit format, and possibly an ASCII format. The information can be displayed and/or stored in the recipient's phone for later use.

FIGS. 3-6 illustrate various system configurations for which the communication protocols and methods of the present invention are useful to communicate information from one user to another user. It should be appreciated, however, that numerous other system configurations and devices may be implemented using the teachings of the present invention.

Figure 3A:
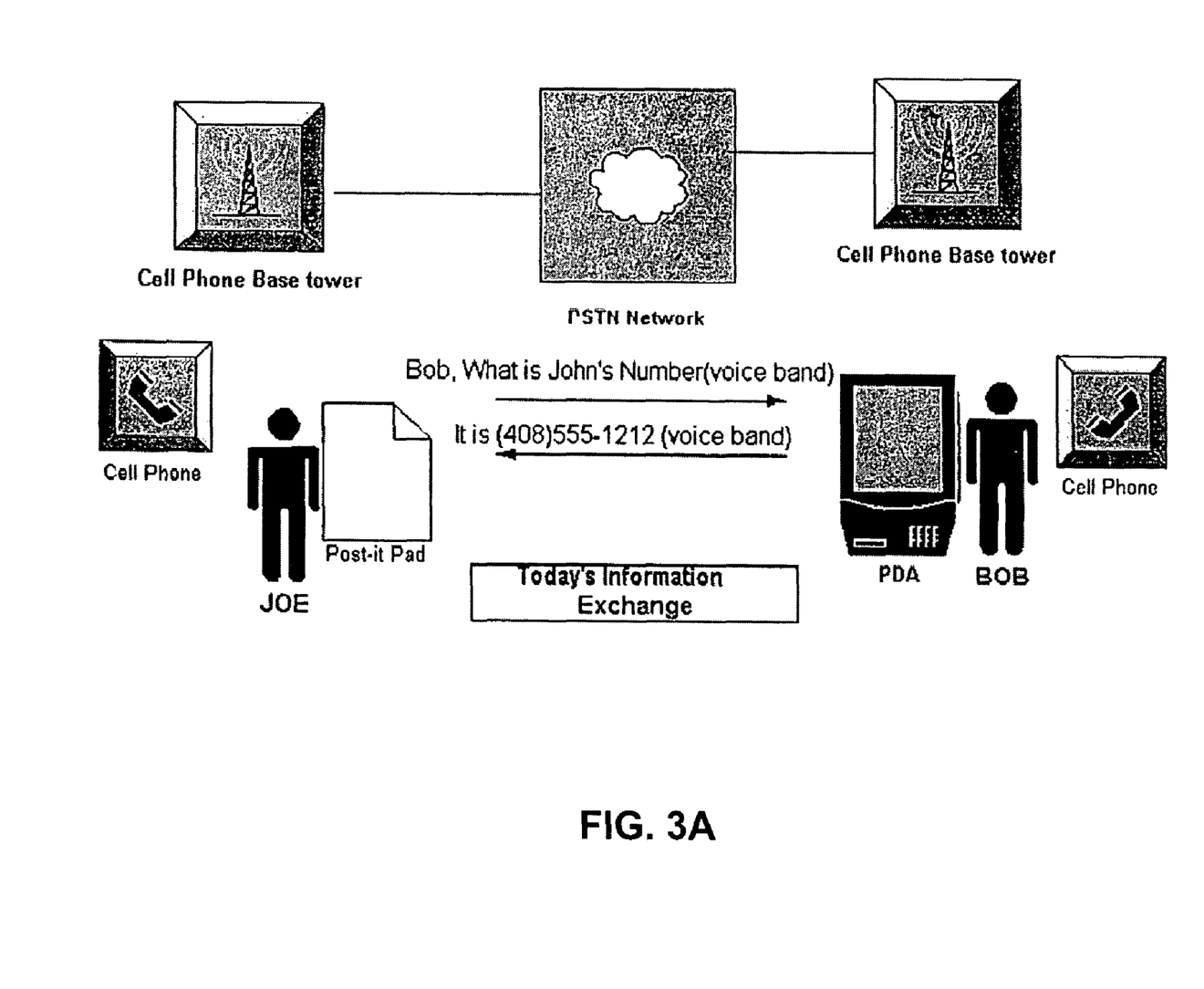
FIGS. 3-6 illustrate various system configurations for which the communication protocols and methods of the present invention are useful to communicate information from one user to another user.
Figure 3B:
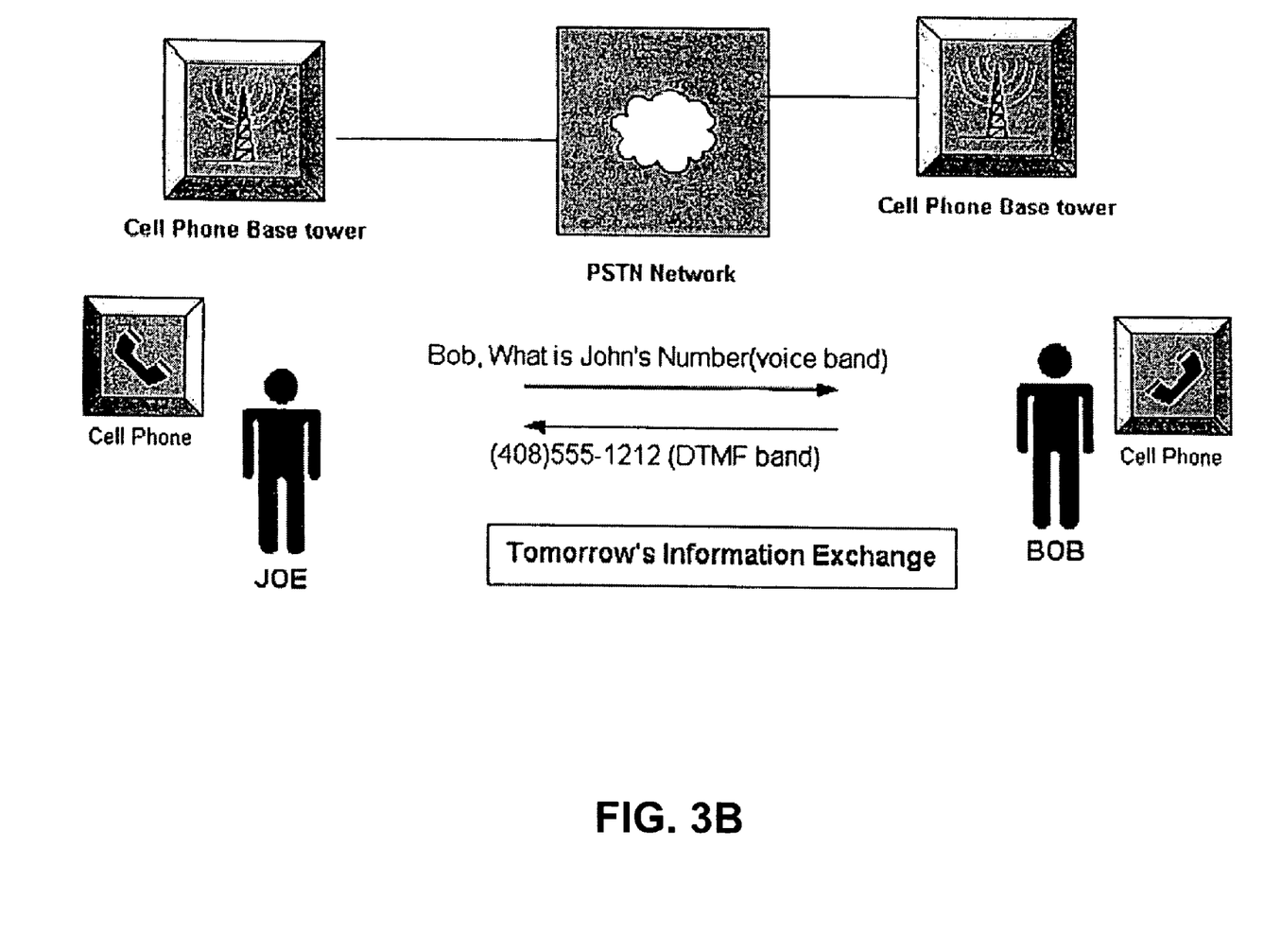

As shown in FIG. 3A, two users are communicating information over the voice band using two cell phones. The user (Bob) providing the requested information accesses the requested information from a personal information source such as a PDA and verbally provides the information to the requesting individual (Joe), who must then write down the information or commit the information to memory. As shown in FIG. 3B, according to the present invention, Bob is able to send the information to Joe using the DTMF conversion protocols of the present invention. Bob either keys in the desired information or locates and retrieves the desired information in a memory of the cell phone and presses a "send" key. The cell phone processes, packetizes and converts the information and sends out a DTMF signal that is received by a cell phone base tower. The DTMF signal is transmitted via a PSTN network to the cell phone base tower associated with Joe's cell phone and on to Joe's cell phone where the DTMF signal is processed to store and/or display the information.

Figure 4A:
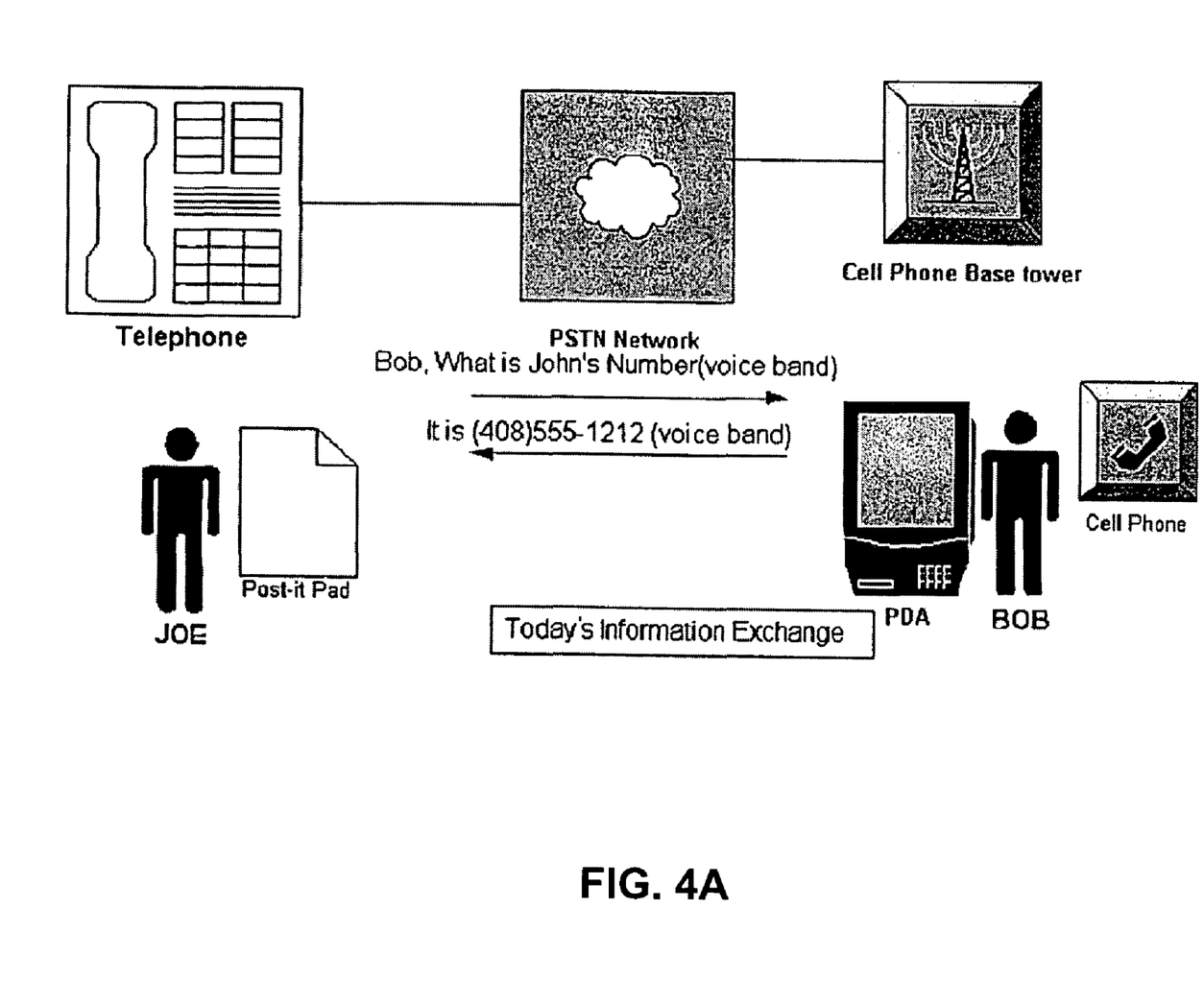
Figure 4B:
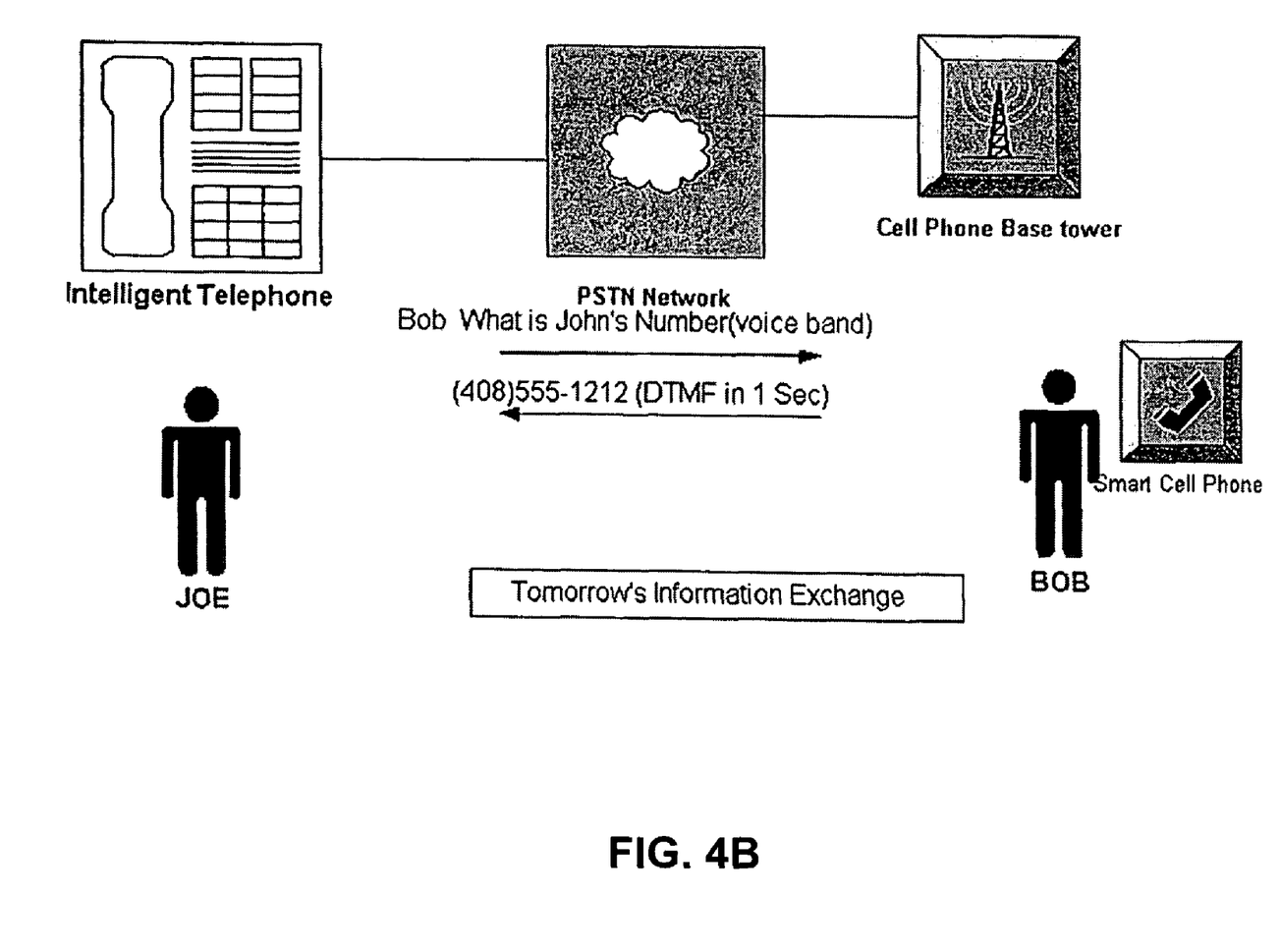
Figure 5A:
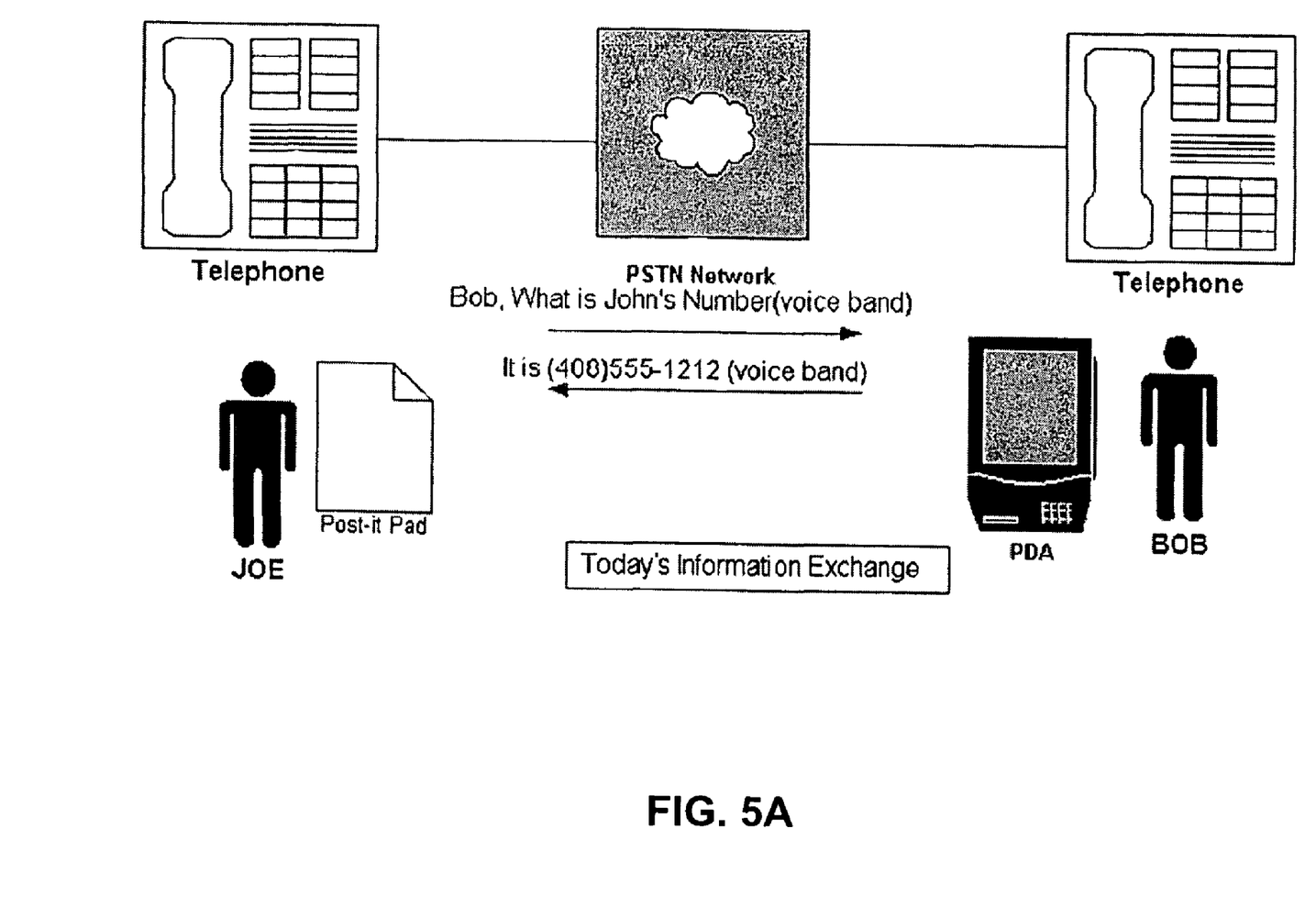
Figure 5B:
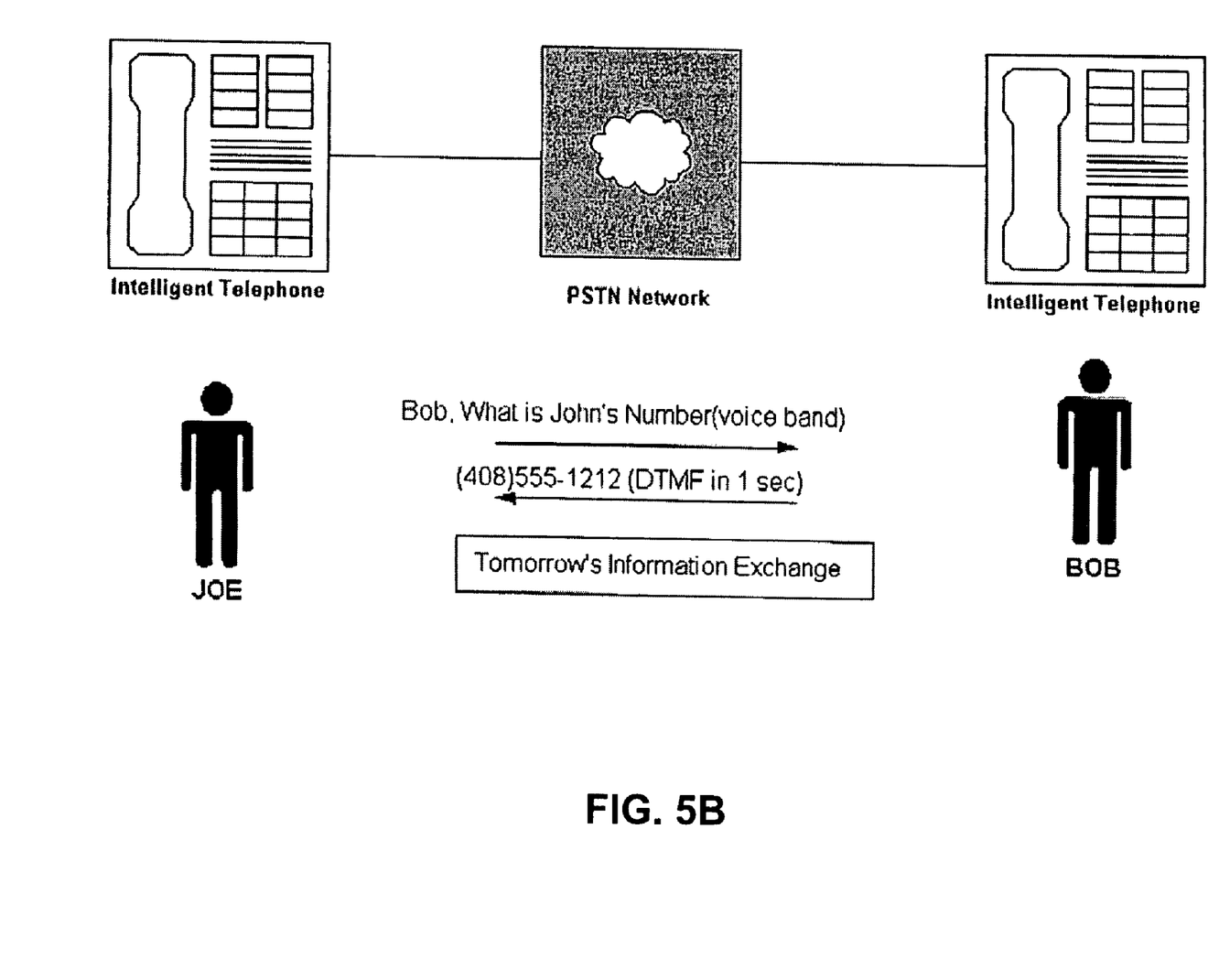

FIGS. 4A and 4B illustrate system configurations similar to the configurations of FIGS. 3A and 3B, respectively. In FIG. 4B, however, the receiving party's communication device comprises an intelligent telephone, e.g. including processing and configuration hardware and software according to the present invention. The intelligent telephone, processes DTMF signals as above. FIGS. 5A and 5B illustrate system configurations similar to the configurations of FIGS. 4A and 4B, respectively. In FIG. 5B, however, the sending party's communication device also comprises an intelligent telephone, e.g. including processing and configuration hardware and software according to the present invention. The intelligent telephone configures and processes information to be sent and transmits the DTMF information signals as above.

Figure 6:
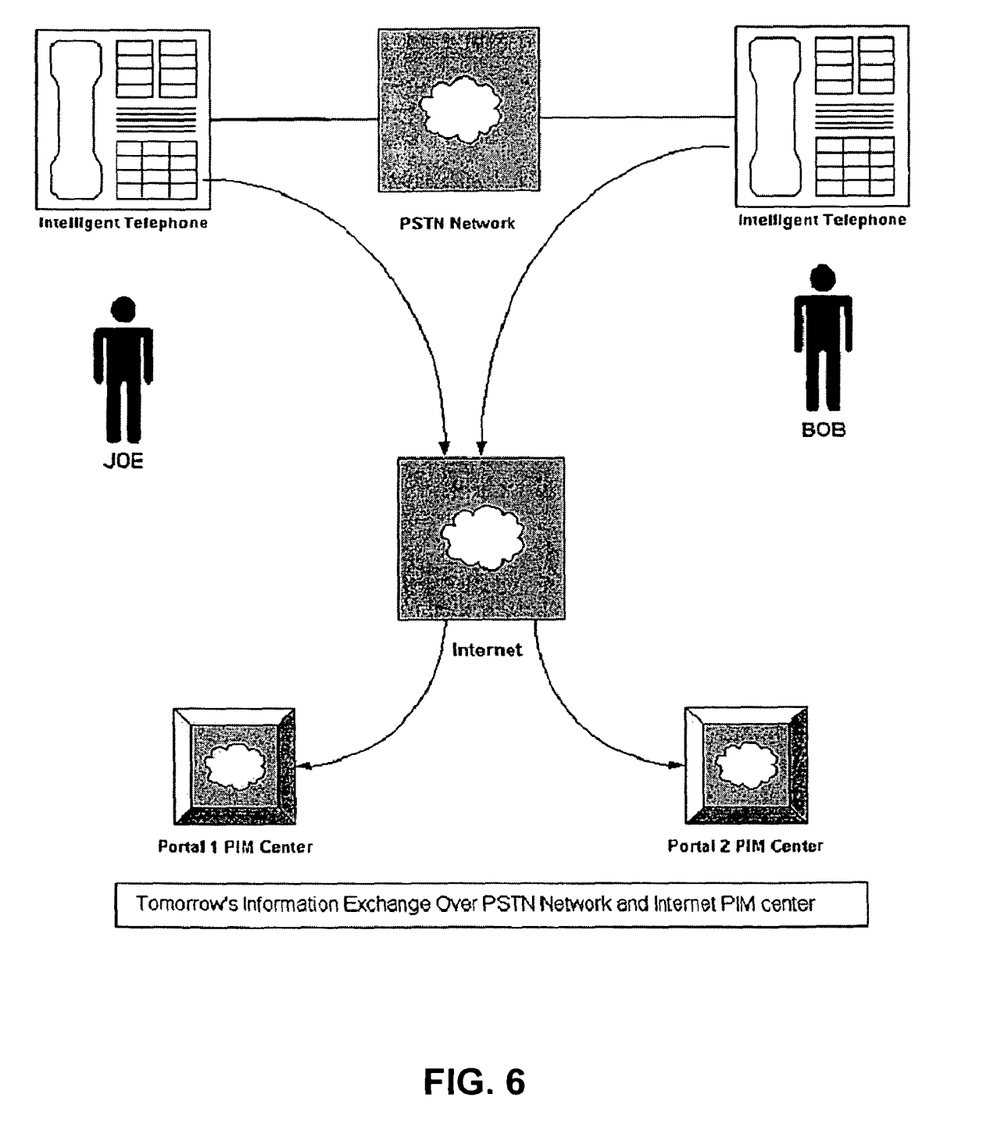

FIG. 6 illustrates a system configuration similar to the configuration of FIG. 5B. As shown, information is sent to one or more personal information management (PIM) devices for retrieval by a user. For example, a DTMF information packet sent from one user to another user may be sent directly to the recipient's associated PIM over the Internet, or the packet may be sent to the recipient's telephone (or other receiving device, e.g., answering machine) which is configured to forward the packet to the recipient's PIM. The recipient may access the PIM over the Internet at any time from any location using any communication device capable of communicating over the Internet.

Figure 7:
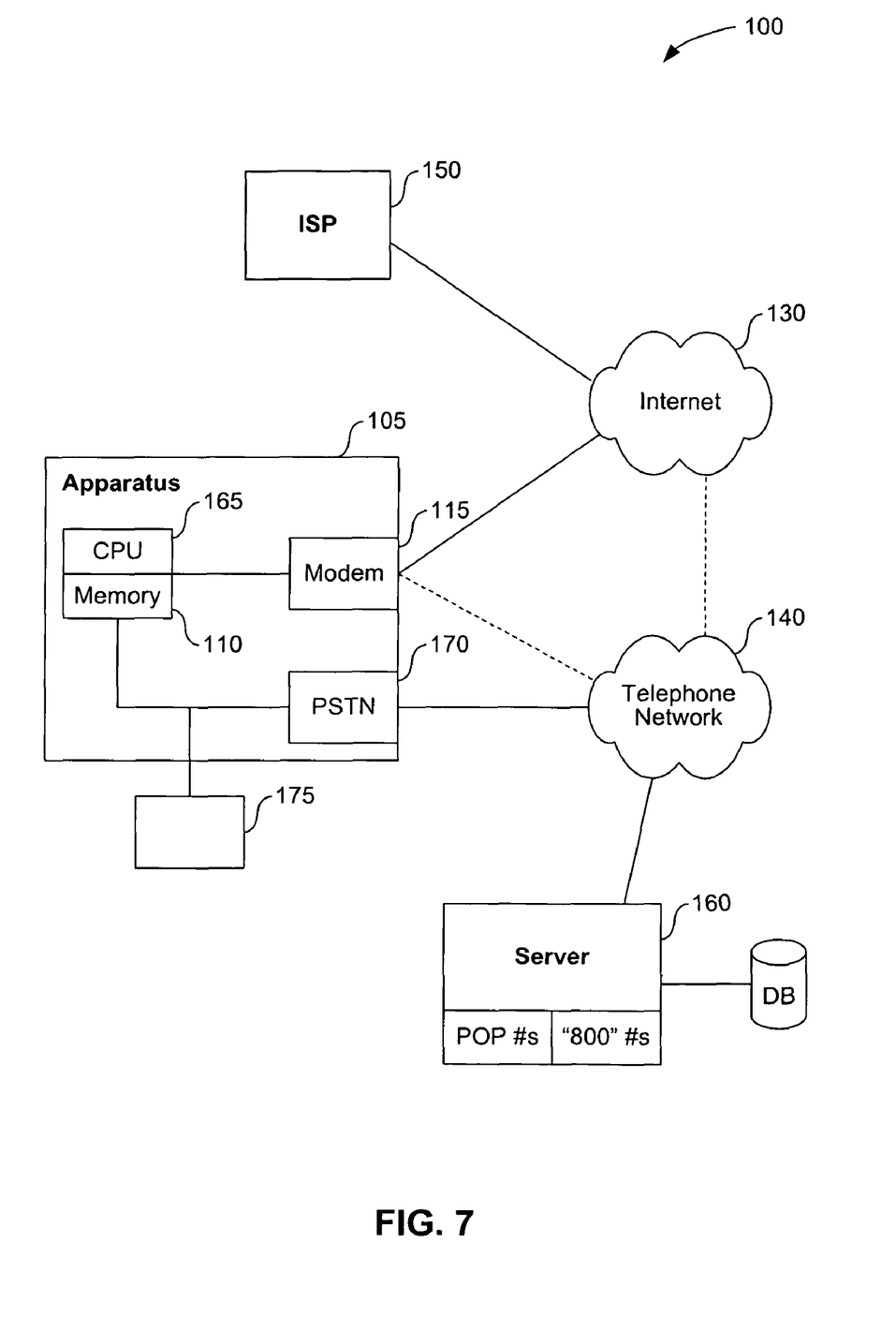
FIG. 7 illustrates a communication apparatus in a communication network according to an embodiment of the present invention.

The protocols of the present invention are also useful for automatically configuring communication apparatus with information. One embodiment of a system 100 including a self-configuring communication apparatus 105 and a configuration server 160 is shown in FIG. 7. The self configuring communication apparatus 105 shown includes both a modem 115 for communicating over a network, e.g., with an Internet service provider (ISP) 150, and a standard telephone hook up module 120. Apparatus 105 also includes a processor 165 and a memory unit 110 for storing various data and configuration information. Modem module 115 may include a standard modem for communicating over a telephone network 140 with various end systems or it may include a DSL interface, NIC, etc., for communicating with various networks, e.g., the Internet 130, over various communication media. Telephone interface module 120 preferably includes a PSTN interface for communicating over telephone network 140. Apparatus 105 also preferably includes a user input device 125 directly coupled to or integrated as part of apparatus 105. User input device 125 typically includes a keypad in the case of a telephone or PDA, or a keyboard in the case of a PC or laptop. However, it should be appreciated that any user input device, such as a touchscreen, electronic pen, microphone (voice to text), etc., that allows a user to enter information may be used.

Conversion of data to the ASCII format is typically performed by the input device interface associated with the device. When a user depresses a key, the input device interface registers the selected key and sends a binary signal representing the selected character to the processor 165. Typically a 7-bit or 8-bit binary ASCII character is sent, although the input device interface may be configured to automatically convert the selected character to a hexadecimal format, an octal format, a BCD format or any other format as desired. A specialized ASCII conversion module may be implemented to convert signals from the user input device 125 to the ASCII format. It should be appreciated that some or all input values may de directly converted to BCD decimal, however, most input devices use ASCII binary as the standard interface data format. For example, standard keyboards and keypads automatically convert user selection of keys into binary ASCII signals readable by a processor.

One embodiment of a self configuring apparatus 105 includes a MODEM interface module 115 that requires an ISP phone number and other parameters to be configured. To enable this a standard PSTN telephone hook up is used to communicate with a configuration information server to obtain configuration information. It should be appreciated that any number of devices that require some form of configuration parameter setup, e.g. DSL Modems, Cable Modems, WEB appliances, etc. can all be configured/setup using a telephone hook up and the DTMF information exchange methodology as described herein.

When a user sets up apparatus 105, e.g., plugs in the PSTN connection module 120 to a phone jack and turns the apparatus on, the apparatus calls up a dedicated server, e.g., server 160, over telephone network 140 using any publicly available phone number, such as an "800" number. The apparatus is preferably configured to automatically call the server when configuration information is needed, although a user may manually configure the apparatus to call the server when desired. The server to which the "800" number is directed receives the phone number of the calling party, i.e., apparatus 100, via a standard ANI (automatic number identification) provided to "800" number owners, and uses this phone number to determine the geographic location of the apparatus. The geographic location is used to determine a nearest point-of-presence (POP) for communicating with an ISP 150. In one embodiment, server 160 performs a look-up of known POPs for a particular ISP based on the area code prefix of the identified phone number. ISP 150 may be identified by the apparatus or assigned by server 160. The server then automatically transmits the ISP POP number(s) using the DTMF signaling methods and protocols as described above. The apparatus can store the received POP number(s) for later use when communicating with ISP 150 is desired. It should be appreciated that POP numbers for other end systems may be determined and communicated to apparatus 105.

Figure 8:
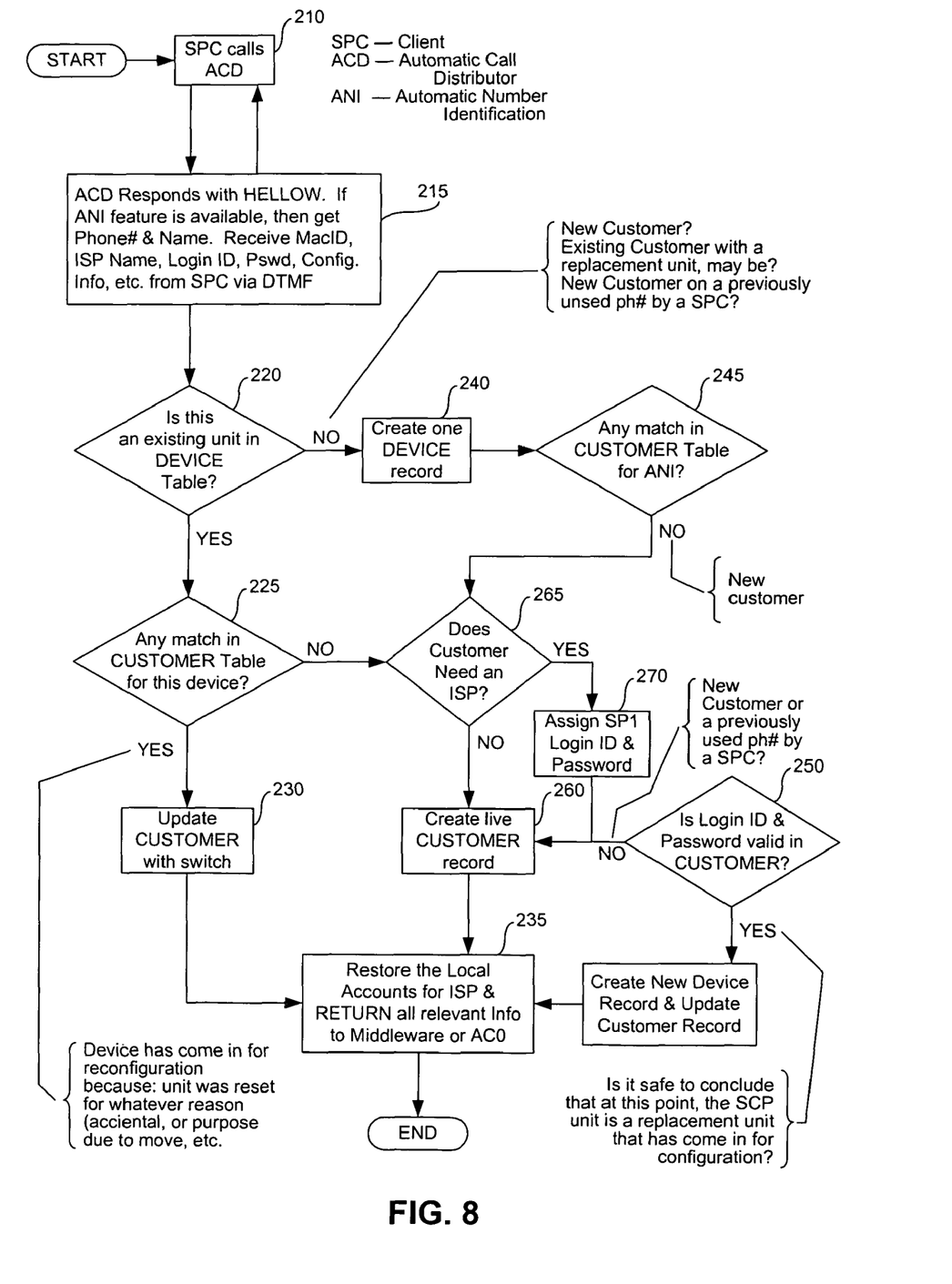
FIG. 8 illustrates a configuration process flow according to an embodiment of the present invention.

FIG. 8 illustrates a configuration process flow according to an embodiment of the present invention. At step 210, a client device ("SPC"), e.g., apparatus 105, contacts a configuration information server ("ACD"), e.g., server 160, over a standard telephone communication channel using an "800" number associated with the server. At step 215, the server responds to the client device with a Hello ACD packet using the DTW packet/conversion protocol of the present invention. An example of a Hello ACD packet is shown in Appendix D. If the ANI feature is available, the server automatically receives the phone number of the client and the name of the calling party, and possibly other information. In response to the Hello ACD packet, the client sends an EEPROM information packet including identification and ISP information to the server using the DTMF packet/conversion protocol of the present invention. A client EEPROM stores client ID information such as the serial number, MAC ID, product ID, hardware version, etc. An example of an EEPROM information packet is shown in Appendix D. Such information packets include sub-fields and values associated with information such as the MACID, Login ID, Password, and configuration information available to the client.

At step 220, the server determines whether the client device has a record in the database based on, e.g., the MAC ID. If a device record exists, at step 225 the server determines whether there is a match for the device in a customer table in the database, e.g., using the Mac ID and/or login ID and user password. If there is a match, the customer database record is updated at step 230 with any new information included in the received information packets. It is clear that reconfiguration is necessary at this point because the client device was likely reset (either accidentally, purposely, e.g., due to a move, etc.). At step 235, the system retrieves the local access number(s) for the identified ISP, and the server sends the information to the client device in the form of one or more configuration information ACD packets that each includes one or more subfields in the Value field. Alternately, such sub-fields may be sent as individual packets. Examples of configuration information ACD packet formats and possible sub-fields are shown in Appendix D.

Returning to step 220, if it is determined that there is no device record in the database for the particular client device, a new device record is created at step 240. At step 245, the system determines whether there is a match for the phone number in the customer table. If there is a match, a validity check is performed using the customer login ID and password at step 250. If the password and login ID are valid, a new device record is created and the customer record is updated at step 255 and the system proceeds to retrieve and send the appropriate configuration information at step 235. If the password and login ID are not valid, a new customer record is created at step 260. At this point it is possible that a customer is likely using a new client device at a previously used phone number interface. If at step 245 it is determined that there is no match in the customer table for the phone number, it is determined whether the customer needs an ISP at step 265. Similarly, if at step 225 it is determined that there is no match in the customer table for the particular device, it is determined whether the customer needs an ISP at step 265. If the customer needs an ISP (e.g., no ISP configuration information was received in the Information packets sent by the client device), an ISP, login ID and password are assigned at step 270 and a new customer record is created at step 260. If it is determined that the customer has an ISP, a new record is created at step 260. After step 260, the system retrieves and sends the appropriate configuration information as above.

Figure 9:
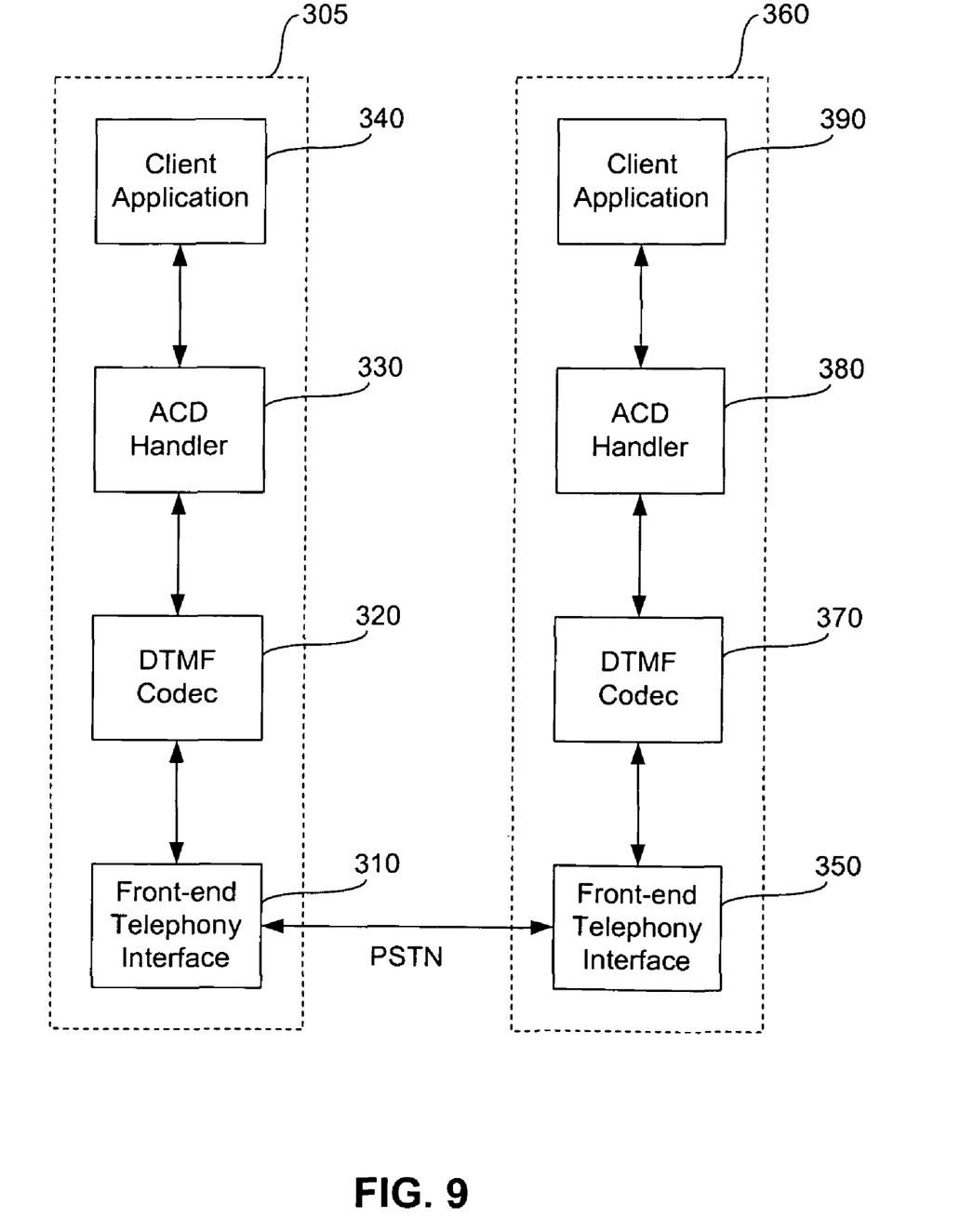
FIG. 9 illustrates various functional layers of the software and hardware components of a client device and a configuration server according to an embodiment of the present invention.

FIG. 9 illustrates various functional layers of the software and hardware components of a client device and a configuration server according to an embodiment of the present invention. Client 305 includes a front-end telephony interface layer 310, DTMF CODEC layer 320, ACD Handler layer 330 and Client Application layer 340. Similarly configuration server 360 includes a front-end telephony interface layer 350, DTMF CODEC layer 370, ACD Handler layer 380 and Server Application layer 390. Telephony interface layers 310 and 350 each include the appropriate hardware, e.g., PSTN interface modules, for communicating and receiving DTMF signals. DTMF CODEC layers 320 and 370 each include software and hardware components for encoding and decoding packets formatted according to the present invention, e.g., ACD information packets.

For example, each CODEC layer includes the hardware and software for encoding transmit packets into DTMF symbols and to decode DTMF symbols into receive packets. ACD Handler layers 330 and 380 each support the protocols of the present invention by performing validation of received packets, generating/building ACD packets for transmission and processing received and transmit packets. Application layers 340 and 390 interface with ACD handler layers 330 and 380, respectively, to process and configure data according to the present invention. Client application layer 340 interfaces with a kernel to retrieve hardware and other client specific information, e.g., for inclusion in an EEPROM packet and an ISP information packet. Server application layer 390 interfaces with the database to store and retrieve configuration information of client 305.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of communicating alphanumeric data including a plurality of alphanumeric characters, the method comprising:
   converting the alphanumeric data to data having a first data format, wherein each converted character comprises a first plurality of characters in the first data format;
   converting the data having the first data format to data having a second data format, wherein each converted character comprises a plurality of numbers in the second data format; and
   communicating the data in the second data format from a first communication device to a second communication device over a voice band in a telephone communication channel during an active voice conversation.

2. The method of claim 1, wherein the first data format is an ASCII format, wherein each character is represented by one of a 7-bit an 8-bit binary number.

3. The method of claim 1, wherein the first data format is a Unicode format, wherein each character is represented by at least four characters.

4. The method of claim 1, wherein the second data format is a BCD decimal format, wherein each character is represented by three numbers.

5. The method of claim 1, wherein the second data format is an octal format, wherein each character is represented by three numbers.

6. The method of claim 1, wherein the first data format is a hexadecimal format, wherein each character is represented by three characters.

7. The method of claim 1, wherein each of the first and second communication devices includes one of a conventional telephone, a cell phone and an intelligent answering machine.

8. The method of claim 1, wherein one of the first and second communication devices includes a communications server.

9. The method of claim 1, wherein each of the first and second communication devices includes a PSTN connection.

10. An apparatus for communicating alphanumeric data including a plurality of alphanumeric characters, the apparatus comprising:
    means for converting the alphanumeric data to data having a first data format, wherein each converted character comprises a first plurality of characters in the first data format;
    means for converting the data having the first data format to data having a second data format, wherein each converted character comprises a plurality of numbers in the second data format; and
    means for communicating the data in the second data format from a first communication device to a second communication device over a voice band in a telephone communication channel during an active voice conversation.

* * * * *

UNITED STATES PATENT AND TRADEMARK OFFICE
CERTIFICATE OF CORRECTION

PATENT NO. : 8,098,801 B2  
APPLICATION NO. : 11/499908  
DATED : January 17, 2012  
INVENTOR(S) : Kasturi et al.

Page 1 of 1

It is certified that error appears in the above-identified patent and that said Letters Patent is hereby corrected as shown below:

Column 10, line 22, in Claim 2, delete "a 7-bit an 8-bit" and insert -- a 7-bit and an 8-bit --.

Signed and Sealed this  
Nineteenth Day of June, 2012

David J. Kappos  
*Director of the United States Patent and Trademark Office*